(12) United States Patent
Chen et al.

(10) Patent No.: US 8,691,473 B2
(45) Date of Patent: Apr. 8, 2014

(54) FUEL CELL MODULE HAVING NON-PLANAR COMPONENT SURFACE

(75) Inventors: Chi-Chang Chen, Puxin Township, Changhua County (TW); Huan-Ruei Shiu, Cimei Township, Penghu County (TW); Wen-Chen Chang, Zhudong Township, Hsinchu County (TW); Fanghei Tsau, Kaohsiung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 181 days.

(21) Appl. No.: 12/860,355

(22) Filed: Aug. 20, 2010

(65) Prior Publication Data

US 2011/0136033 A1 Jun. 9, 2011

Related U.S. Application Data

(60) Provisional application No. 61/267,387, filed on Dec. 7, 2009.

(30) Foreign Application Priority Data

Mar. 12, 2010 (TW) ................................ 99107220 A (51) Int. Cl.
*H01M 4/64* (2006.01)

(52) U.S. Cl.
USPC ........................................................ 429/517

(58) Field of Classification Search
USPC .................................................. 429/400–535
See application file for complete search history.

(56) References Cited

U.S. PATENT DOCUMENTS

| 3,526,548 A | * | 9/1970 | Hespel et al. ................. 126/86 |
| 5,464,700 A | | 11/1995 | Steck et al. |
| 5,514,487 A | | 5/1996 | Washington et al. |
| 5,750,281 A | | 5/1998 | Washington et al. |

(Continued)

FOREIGN PATENT DOCUMENTS

| CN | 101479876 A | 7/2009 |
| JP | 2006-107898 | 4/2006 |

(Continued)

OTHER PUBLICATIONS

Extended European Search Report for European Application No. 10180724.6, dated May 12, 2011.

(Continued)

*Primary Examiner* — Jonathan G Leong (74) *Attorney, Agent, or Firm* — Finnegan, Henderson, Farabow, Garrett & Dunner, LLP (57) ABSTRACT

A fuel cell module may include a membrane electrode assembly two gas diffusion layers, two current collectors, two sealing members, and a fluid flow plate assembly. The membrane electrode assembly may include at least one membrane for fuel cell reactions, and the two gas diffusion layers may be respectively coupled with the two opposite sides of the membrane electrode assembly. The fluid flow plate assembly is coupled with the membrane electrode assembly at a first side of the two opposite sides of the membrane electrode assembly. At least one of the membrane electrode assembly, the two gas diffusion layers, the two current collectors, and the two sealing members has a non-planar surface prior to an assembly of the membrane electrode assembly, the two gas diffusion layers, the two current collectors, and the two sealing members, and the non-planar surface is at least partially flattened when the assembly occurs.

14 Claims, 10 Drawing Sheets

(56) References Cited

U.S. PATENT DOCUMENTS

| | | | |
|---|---|---|---|
| 6,017,648 A | 1/2000 | Jones | |
| 6,127,058 A | 10/2000 | Pratt et al. | |
| 6,232,008 B1 | 5/2001 | Wozniczka et al. | |
| 6,274,262 B1 | 8/2001 | Canfield | |
| 6,410,179 B1 | 6/2002 | Boyer et al. | |
| 6,500,580 B1 | 12/2002 | Marvin et al. | |
| 6,607,858 B2 | 8/2003 | Wozniczka et al. | |
| 6,610,435 B1 | 8/2003 | Maruyama et al. | |
| 7,112,385 B2 * | 9/2006 | Rock | 429/446 |
| 7,220,507 B2 | 5/2007 | Liu et al. | |
| 7,494,737 B2 | 2/2009 | Arisaka et al. | |
| 7,531,263 B2 | 5/2009 | Liu et al. | |
| 7,569,290 B2 | 8/2009 | Liu et al. | |
| 7,572,533 B2 | 8/2009 | Liu et al. | |
| 7,592,093 B2 | 9/2009 | Liu et al. | |
| 7,597,989 B2 | 10/2009 | Hu et al. | |
| 2005/0164068 A1 * | 7/2005 | Mann | 429/37 |
| 2009/0075153 A1 | 3/2009 | Son et al. | |
| 2009/0155663 A1 | 6/2009 | Serizawa et al. | |

FOREIGN PATENT DOCUMENTS

| | | |
|---|---|---|
| JP | 2006-196328 | 7/2006 |
| KR | 10-2007-0072872 | 7/2007 |
| KR | 10-2009-0007573 | 1/2009 |
| WO | WO 98/47197 | 10/1998 |
| WO | WO 2006038701 A1 * | 4/2006 |
| WO | WO 2009/025613 A1 | 2/2009 |

OTHER PUBLICATIONS

Notification of Reasons for Refusal mailed by the Japanese Patent Office on Nov. 13, 2012 in Japanese Application No. 2010-215995.

* cited by examiner

FUEL CELL MODULE HAVING NON-PLANAR COMPONENT SURFACE

CROSS REFERENCE TO RELATED APPLICATIONS

This application claims priority from U.S. provisional application No. 61/267,387, filed on Dec. 7, 2009, the entirety of which is incorporated by reference herein. The application also relates to three co-pending applications three co-pending applications listing the same inventors and claiming priority also from U.S. provisional application No. 61/267,387. The first one is entitled "Fluid Flow Plate Assemblies," filed on Aug. 9, 2010, with Ser. No. 12/853,096; the second one is entitled "Fluid Flow Plate Assembly Having Parallel Flow Channels," filed on Aug. 20, 2010, with Ser. No. 12/860,421; and the third one is entitled "Modularized Fuel Cell Devices And Fluid Flow Plate Assemblies," filed on Aug. 20, 2010, with Ser. No. 12/860,460. This Application further claims priority from Taiwan Patent Application No. 099107220, filed on Mar. 12, 2010, the entirety of which is incorporated by reference herein.

BACKGROUND

1. Field of the Invention

This application relates in general to fuel cell devices and in particular to fuel cell modules having a component configured to provide a contact force.

2. Description of the Related Art

Fluid flow plates are structures that are designed for fluid-related applications, such as for carrying, delivering, dividing, and/or distributing one or more types of fluids. The term "fluid" is used here in a broad sense, which can be anything that is capable of flowing from one point to another. For example, a fluid may include air, gas, liquid, viscous fluid, etc., each of which is capable of flowing or moving itself or a part of it from one point to another.

Figure 1:
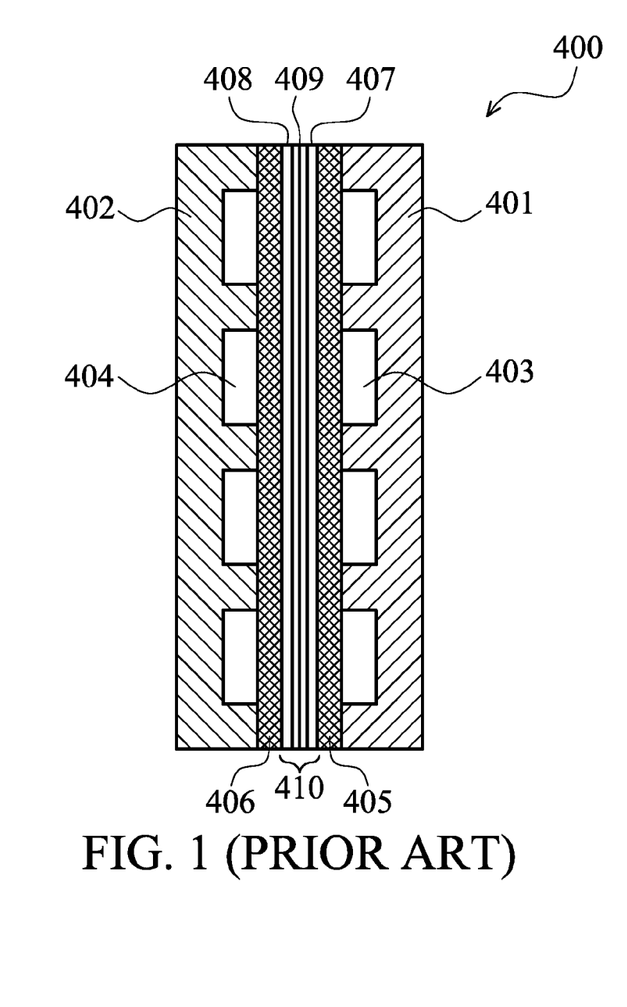
FIG. 1 illustrates a sectional view of an exemplary fuel cell device in the prior art.

As an illustrative example, one of the many uses for fluid flow plates is fuel cell applications, in which fluid flow plates may be used to transport, guide, and/or distribute one or more kinds of "fuel", which may be in a liquid or gaseous form, for generating electric power. FIG. 1 illustrates a sectional view of an exemplary fuel cell device in the prior art. Referring to FIG. 1, a single fuel cell 400, such as a Proton Exchange Membrane Fuel Cell (also known as "PEMFC"), may include a membrane electrode assembly 410, two gas diffusion layers 405 and 406, and two fluid flow plates 401 and 402. As illustrated, the two gas diffusion layers 405 and 406 may sandwich between them the membrane electrode assembly 410, and the two fluid flow plates 401 and 402 may sandwich between them both the membrane electrode assembly 410 and the two gas diffusion layers 405 and 406. The fluid flow plates 401 and 402 each may provide one or more flow channels, such as flow channels 403 and 404, and a reactant fluid may flow through each of the flow channels. As an example, the membrane electrode assembly 410 may include a proton exchange membrane 409, an anode catalyst layer 407, and a cathode catalyst layer 408. The anode and cathode catalyst layers 407 and 408 each may include platinum or platinum alloy, which may serve as a catalyst and facilitate electrochemical fuel cell reactions.

Traditional fuel cell devices, in certain instances, may provide limited contact force for internal components, such as electrodes or other contacts. It may be desirable to provide fuel cell devices that provide a contact force between some of the components of the fuel cell devices.

SUMMARY

A fuel cell module in certain embodiments may include a membrane electrode assembly two gas diffusion layers, two current collectors, two sealing members, and a fluid flow plate assembly. The membrane electrode assembly may include at least one membrane for fuel cell reactions, and the two gas diffusion layers may be respectively coupled with the two opposite sides of the membrane electrode assembly. The two current collectors may be respectively coupled with the two gas diffusion layers, and the two sealing members may be respectively coupled with the two current collectors. The fluid flow plate assembly is coupled with the membrane electrode assembly at a first side of the two opposite sides of the membrane electrode assembly, and the membrane electrode assembly may have at least a corresponding one of the two gas diffusion layers, at least a corresponding one of the two current collectors, and at least one of the two sealing members between the fluid flow plate assembly and the first side of the membrane electrode, The fluid flow plate assembly may include a fluid flow channel having an exposed side that is coupled with a membrane of the at least one membrane, Furthermore, in some embodiments, at least one of the membrane electrode assembly, the two gas diffusion layers, the two current collectors, and the two sealing members has (prior to an assembly of the membrane electrode assembly, the two gas diffusion layers, the two current collectors, and the two sealing members) a non-planar surface that is at least partially flattened when the assembly occurs. In some embodiments, at least one of the two current collectors has a non-planar surface prior to an assembly of the membrane electrode assembly, the two gas diffusion layers, the two current collectors, and the two sealing members, and the non-planar surface is at least partially flattened when the assembly occurs.

In another embodiment, a fuel cell system may include a holder and a plurality of fuel cell modules. The holder provide a fuel cell module mount to the fuel cell system and may have a channel for providing an incoming fluid. Each of the fuel cell modules may have an edge mounted to the holder, and the plurality of fuel cell modules are arranged in a radial configuration around the holder.

BRIEF DESCRIPTION OF DRAWINGS

Embodiments disclosed herein may be better understood with references made to the accompanying drawings, wherein.

DETAILED DESCRIPTION OF EMBODIMENTS

Embodiments disclosed herein include fuel cell modules that have one or more components that may be structured to provide a non-planar surface, which may provide a contact force in assembling the fuel cell modules or in assembled fuel cell modules. In some embodiments, a current collector or another component may have a curved or polygonal surface protruding toward a membrane electrode assembly. Depending on system designs, applications, or other factors, the contact force may provide improved electrical conductivity, consistency in electrical conductivity, and/or long-term reliability in some embodiments.

Figure 2A:
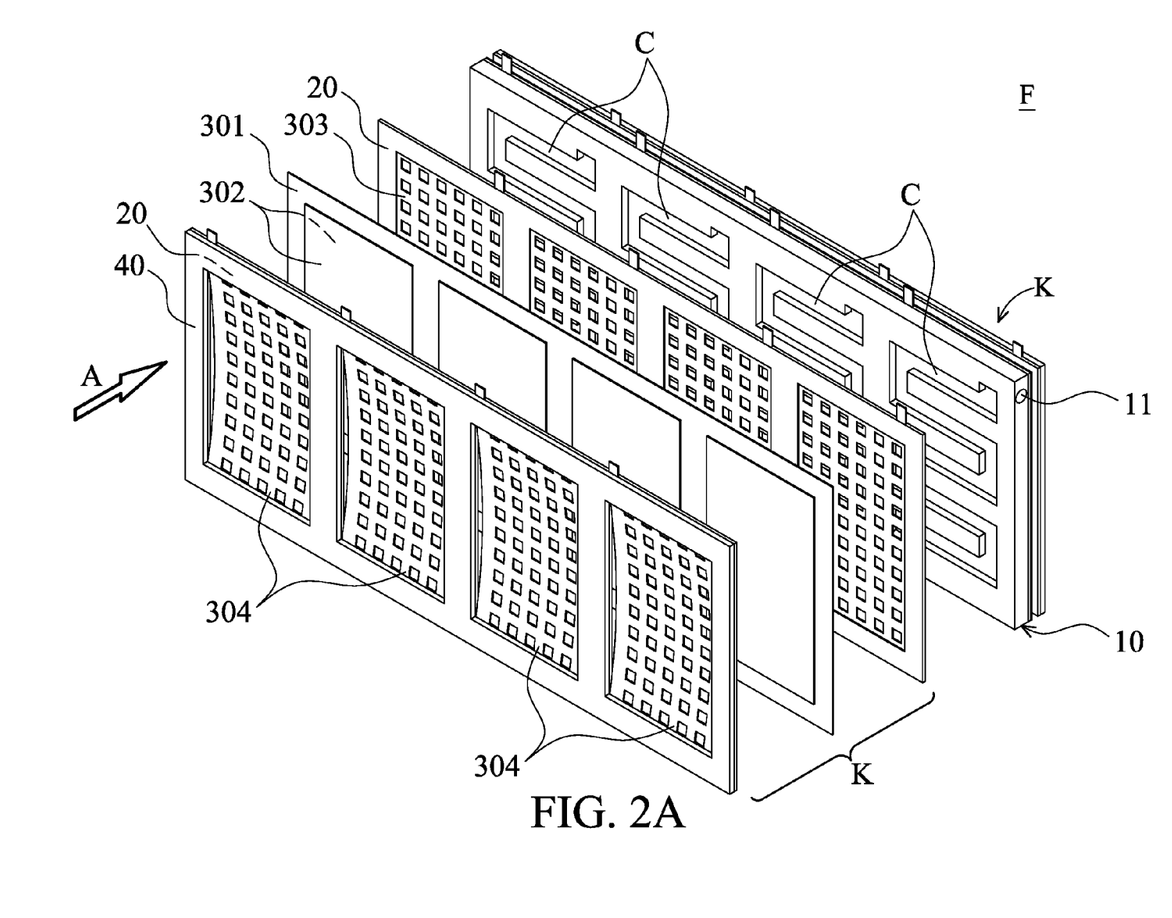
FIG. 2A illustrates an exploded view diagram of an exemplary fuel cell module device consistent with an embodiment.
Figure 2B:
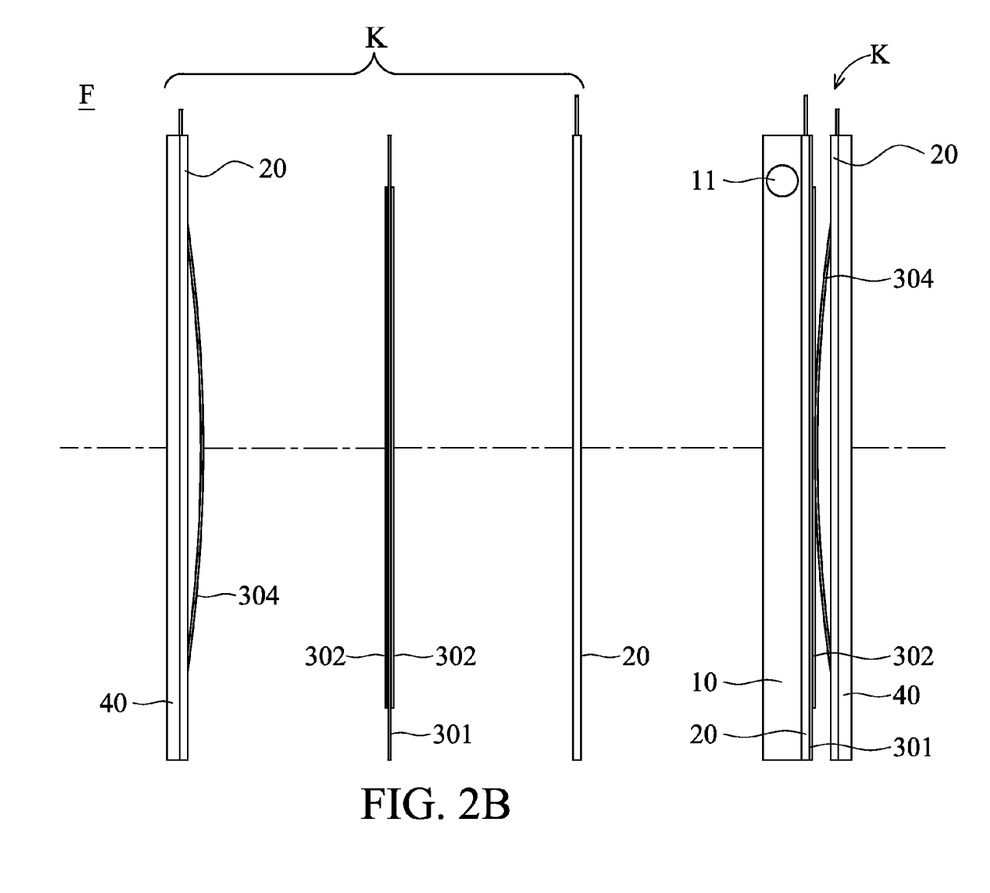
FIG. 2B illustrates a side view diagram of an exemplary fuel cell module consistent with an embodiment.

FIG. 2A illustrates an exploded view diagram of an exemplary fuel cell module device consistent with an embodiment. FIG. 2B illustrates a side view diagram of an exemplary fuel cell module, in both pre-assembly and post-assembly configurations, consistent with an embodiment. Referring to FIGS. 2A and 2B, a fuel cell module F may include two interface units K and a fluid flow plate assembly 10 disposed or coupled between the two interface units K in one embodiment. The fluid flow plate assembly 10 may have a plurality of channels C formed on one side as illustrated or on both of the opposite sides of the fluid flow plate assembly 10, respectively facing the two interface units K.

One or both of the interface units K may include a sealing member 20, a membrane electrode assembly 301, one or more gas diffusion layers 302 (with the front one shown in the figure), two current collectors 303 and 304 that may be coupled (directly or indirectly) together, in the order illustrated or in a different order. In some embodiments, the interface unit K may also include a carrier 40 coupled directly or indirectly with the current collector 304. In one embodiment, the two gas diffusion layers 302 may be respectively coupled with or attached to the two opposite sides of the membrane electrode assembly 301. And the coupling may occur directly or indirectly by one of various attachment techniques, such as by hot pressing. Examples of attachment techniques may generally include injection molding, hot pressing or adhesive. Each of the two current collectors 303 and 304 may be respectively coupled to one of the two gas diffusion layers on one side and one of the two sealing member 20 on the other side. In some embodiments, the sealing members 20 may be respectively attached to the two current collectors 303 and 304 by an injection molding, a hot pressing, and/or an adhesive. Furthermore, the sealing members 20 may be respectively coupled with the two opposite sides of the membrane electrode assembly 301 by hot pressing.

In one embodiment, the current collector 304 may be disposed on the carrier 40 and may protrude toward the membrane electrode assembly 301. In some embodiments, one or more of the components illustrated in FIGS. 2A and 2B (the membrane electrode assembly 301, the two gas diffusion layers 302, the two current collectors 303 and 304, and the two sealing members 20) may have a non-planar surface to provide a contact force in assembling the fuel cell module. In some embodiments, the contact force may remain in the fuel cell module after it is assembled.

Referring to FIG. 2A, the fluid flow plate assembly 10 may have a number of fluid flow channels C facing the interface unit K and may have additional fluid flow channels C at the opposite side of the fluid flow plate assembly 10 facing the other interface unit K. The fluid flow plate assembly 10 may be a rectangular or substantially rectangular structure in one embodiment. In one embodiment, the fluid flow plate assembly 10 may include a first manifold 11 and a second manifold 12 that communicate with the fluid flow channels C, as shown in FIG. 2D.

A reactant/incoming fluid may enter the first manifold 11 through a fluid inlet 11a of the fluid flow plate assembly 10. Part of the incoming fluid may flow through fluid flow channels C, which provides an exposed reaction area for the fluid released into the fluid flow channel (released fluid), such as a reaction area exposed to a membrane of the interface unit K, to facilitate electrochemical fuel cell reactions. In other words, the fluid flow channels C may have an exposed side that is coupled with a membrane of the interface unit K. The fluid, partially or fully reacted, may be discharged through the second manifold 12, and the discharged fluid may leave the fluid flow plate assembly 10 through a fluid outlet 12a of the fluid flow plate assembly 10.

Figure 2C:
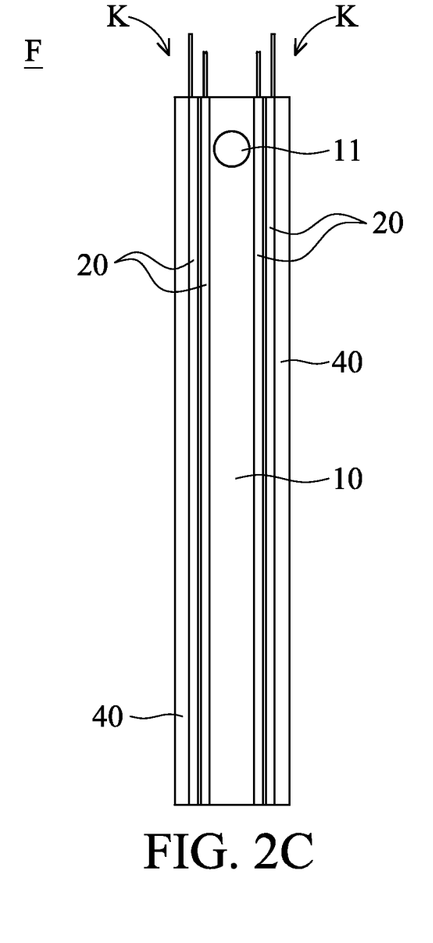
FIG. 2C illustrates a side view diagram of an exemplary fuel cell module consistent with an embodiment.
Figure 2D:
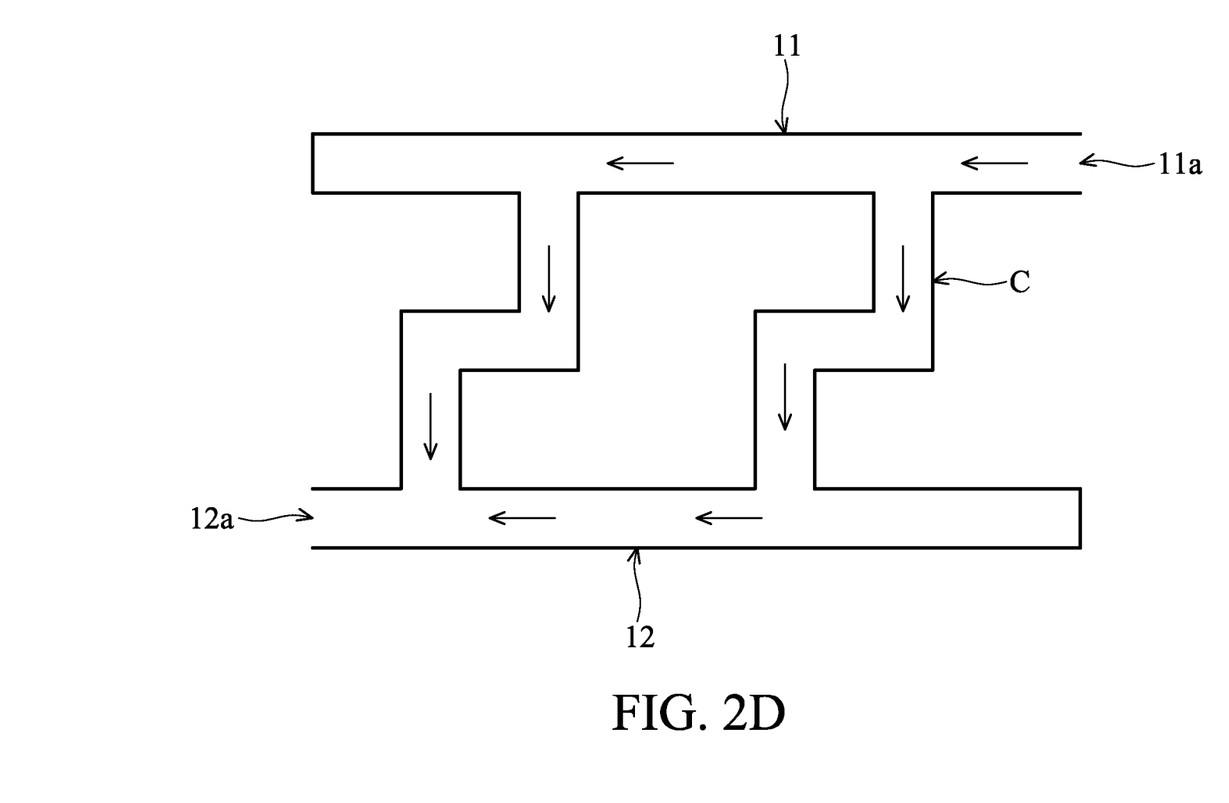
FIG. 2D illustrates a sectional view of an exemplary fluid flow plate assembly including a first manifold and a second manifold that communicate with a plurality of fluid flow channels consistent with an embodiment.

Specifically, in some embodiments, the fluid flow plate assembly 10 may include the first manifold 11, the second manifold 12, and multiple fluid flow channels C coupled between the first manifold 11 and the second manifold 12, as shown in FIG. 2D. The first manifold 11 has its fluid inlet 11a at the right end of the first manifold 11 for receiving the incoming fluid and extends along a first direction (such as from the right lateral side of the fluid flow plate assembly 10 to its left lateral side) to provide a channel for transporting the incoming fluid partially along the first direction. The second manifold 12 may have its fluid outlet 12a at the left end of the second manifold 12 for discharging a discharged fluid, and the discharged fluid may include a portion of the incoming fluid, which may have been partially or fully reacted. The second manifold 12 may extend along a second direction (such as from the right lateral side of the fluid flow plate assembly 10 to its left lateral side), to provide a channel for transporting the discharged fluid partially along the second direction. Both the first and second directions may be substantially parallel with the fluid distribution plane of the fluid flow channels. Examples of the fluid flow channels are illustrated as fluid flow channels C in FIG. 2A, which extend in at least two (vertical and horizontal) directions and extend along a fluid distribution plane.

The first manifold 11 may release the incoming fluid through one or more fluid distribution outlets (the openings between the first manifold 11 and flow channels) on the first manifold 11. The second manifold 12 may receive the discharged fluid through one or more discharged fluid inlets (the openings between the second manifold 12 and flow channels) on the second manifold 12. Each of the fluid flow channels C, as illustrated in FIG. 2A, may be coupled between one distribution outlet of the first manifold 11 and one discharged fluid inlet of the second manifold 12 for distributing at least one portion of the released fluid from the first manifold. In one embodiment, the fluid flow channel C may have multiple channel sections extending in at least two directions and extending substantially along the fluid distribution plane, which is parallel to the corresponding contact surface of the interface unit K. As a result, a portion of the released fluid may flow through the fluid flow channel C and through the distribution outlet to the second manifold 12 as the discharged fluid, Both the first and second directions may be substantially parallel with the fluid distribution plane.

FIG. 2C illustrates a side view diagram of an exemplary fuel cell module consistent with an embodiment. Referring to FIG. 2C, the fuel cell module F may be formed by assembling the interface units K with the fluid flow plate 10. In one embodiment, when the interface units K with the fluid flow plate 10 are assembled, the curved or non-planar member with the interface units K may be flattened or partially or substantially flattened. In some embodiments, the deformation of a non-planar member may create the contact force described above.

Figure 3:
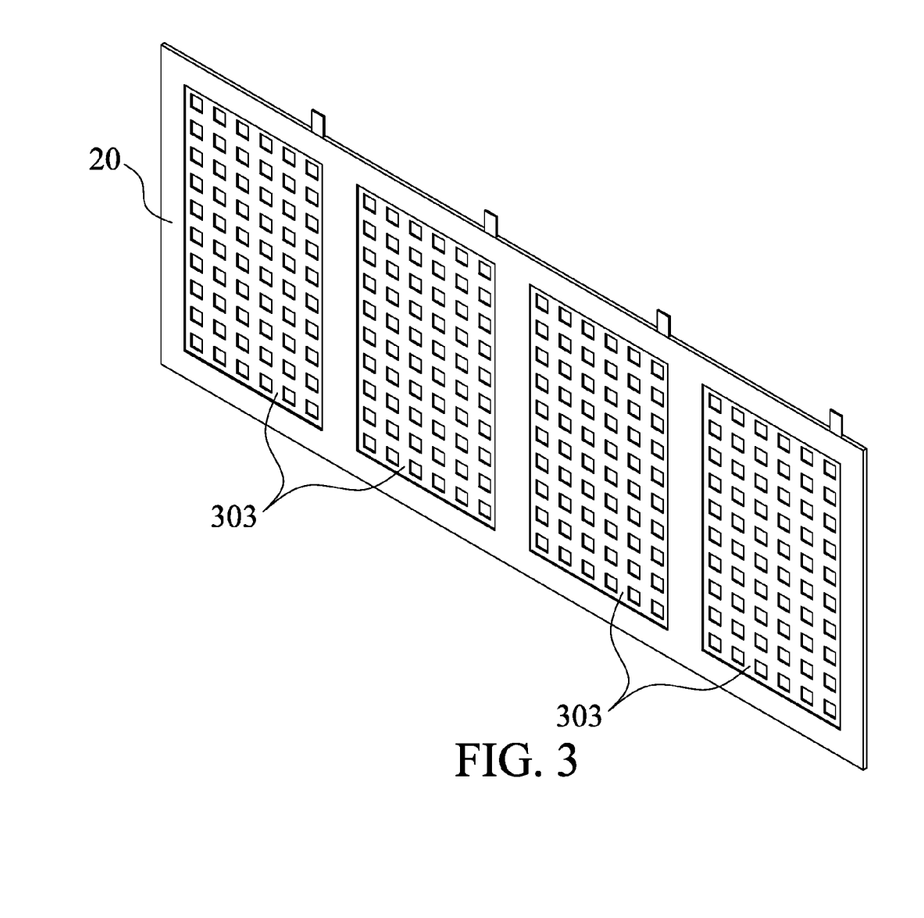
FIG. 3 illustrates a perspective diagram of exemplary current collectors encompassed by a sealing member consistent with an embodiment.

As shown in FIG. 3, the sealing member 20 may be attached to and may encompass the first current collector 303 by injection molding, hot pressing or adhesive. Similarly, the sealing member 20 and the membrane electrode assembly 301 may be coupled with each other by hot pressing. The fluid flow plate assembly 10 and the membrane electrode assembly 301 may be tightly coupled to prevent leakage of the reactant fluid. In one of the embodiments, the two current collectors (303 shown here) may have a non-planar surface that protrudes toward the membrane electrode assembly 301 such that a contact force is provided by the two current collectors toward each corresponding gas diffusion layer 302 (and also toward the membrane electrode assembly 301). In the illustrated example in FIG. 2B, the contact force for the pre-assembled interface K at the left of FIG. 2B is a lateral force toward the right side, and the contact force for the assembled interface K at the right of FIG. 2B is a lateral force toward the left side.

Figure 4A:
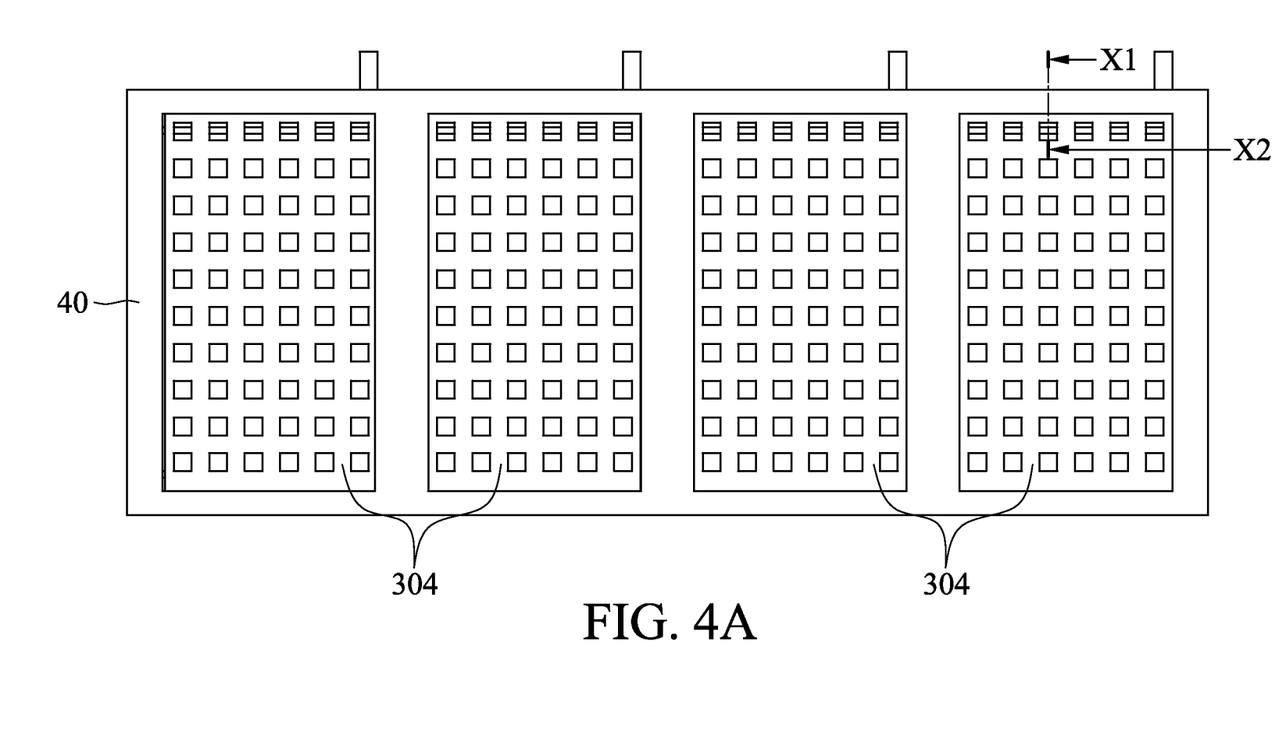
FIG. 4A illustrates a front view of exemplary current collectors disposed on an exemplary carrier consistent with an embodiment.

FIG. 4A illustrates a front view of exemplary current collectors disposed on an exemplary carrier consistent with an embodiment. Referring to FIG. 4A, the carrier 40 (or in some embodiment a frame, which may be an outer frame provided by a fluid flow plate assembly to be stacked over the current collector 304) may provide openings to expose certain regions of the current collector 304 to allow fuel exchange or fuel reaction of a fuel cell module.

Figure 4B:
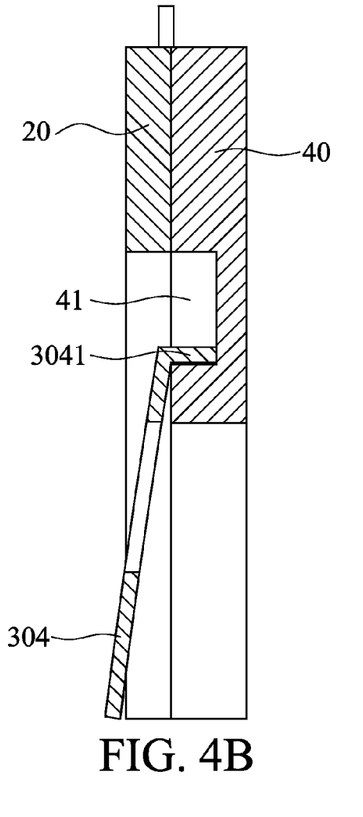
FIG. 4B illustrates a sectional view of an edge structure of an exemplary current collector and a receiving slot of an exemplary carrier consistent with an embodiment.

FIG. 4B illustrates a sectional view of an edge structure of an exemplary current collector and a receiving slot of an exemplary carrier consistent with an embodiment. In the embodiments above, the non-planar member(s) of the interface unit K may be attached to other members of the interface unit K by external devices or the various attachment techniques described above. In some other embodiments, the non-planar member(s) of the interface unit K may have certain edge structure(s), such as protrusions, flanges, hooks, or datum that may interact with another member of the interface unit K. The edge structure may be placed at one or both edges (such as upper and lower edges of the current collector 303 in FIG. 2B).

Referring to FIG. 4B as an example of such edge structure, an embodiment of the current collector 304 has a curved and protruding structure and may have an edge structure, which may be a protrusion, a hook, a bend, a flange, or an L-shaped or angled edge extension. In one embodiment, one or more edge structure, such as edge structure 3041 (only one shown), at one or both ends of the current collector 304 may enter into or engage with a slot 41 (only one shown; may appear on both edges) of a neighboring member, such as the carrier 40. FIG. 4A illustrates an embodiment in which multiple edge structures are placed on or near the top edge of the current collector 304.

Figure 4C:
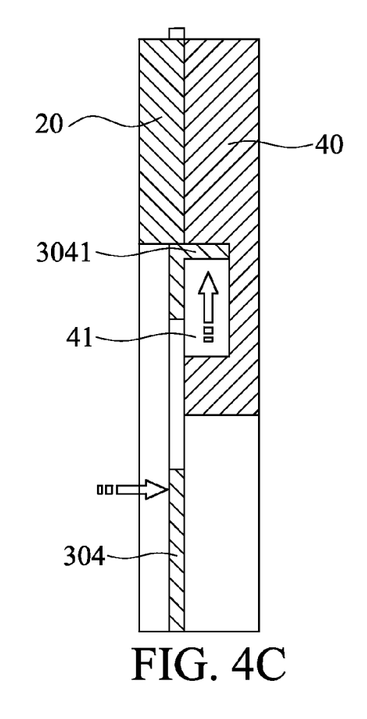
FIG. 4C illustrates a sectional view along X1-X2 in FIG. 4A, of an exemplary current collector disposed on an exemplary carrier consistent with an embodiment.

Referring to FIG. 4B, the slot 41 may provide space for the edge structure 3041 to move within the slot 41. When the current collector 304 and the carrier 40 are pressed together or toward the membrane electrode assembly 301 (such as along the direction of an arrow A illustrated in FIG. 2A), the edge structure 3041 may slide outwardly within the slot 41. FIG. 4C illustrates a sectional view along X1-X2 in FIG. 4A of an exemplary current collector disposed on an exemplary carrier consistent with an embodiment. Referring to FIG. 4C, the edge structure 3041 may slide outwardly within the slot 41. In some embodiment, the designs of the edge structure 3041, the slot 41, their dimensions, and the distance the edge structure 3041 may travel within the corresponding receiving slot 41, or other factors or structure, may be varied to adjust or control the contact force. In one embodiment, the current collector 304 may be pressed and flattened or partially or substantially flattened during the assembly of the fuel cell module F. The contact force exerted by the flattened current collector 304 or the flattened surface of another component of the fuel cell module F may provide a tight contact within the fuel cell module F, such as between the gas diffusion layer 302 and the second current collector 304 and may reduce the contact impedance between them. In some embodiments where edge structures are not used, the interface unit K may still have some tolerance to allow one or more non-planar members be flattened or partially or substantially flattened (and thereby extend horizontally or vertically) based on the inherent flexibility of one or more materials or the inter-layer-movement flexibility among different layers before or when the layers of the interface unit K are tightly pressed and attached to each other.

Figure 5A:
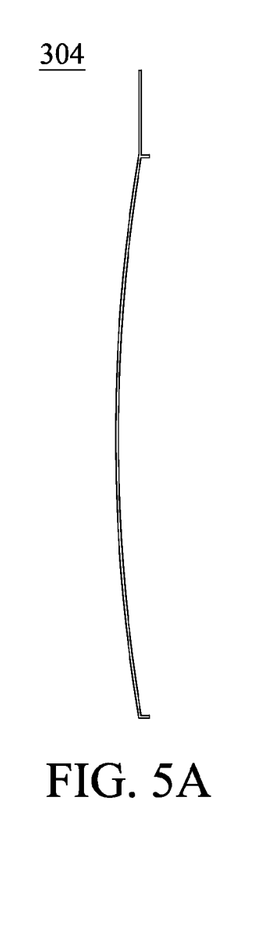
FIG. 5A illustrates a side view of an exemplary current collector consistent with an embodiment.
Figure 5B:
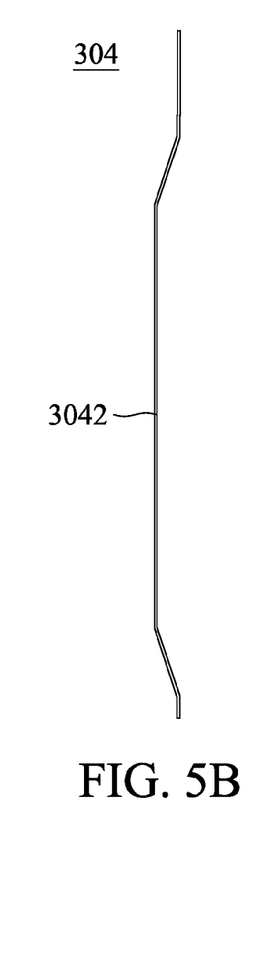
FIG. 5B illustrates a side view of another exemplary current collector consistent with an embodiment.

FIG. 5A illustrates a side view of an exemplary current collector consistent with an embodiment. The current collector 304 may have a curved profile as shown in FIG. 5A in one embodiment. Various non-planar surfaces (or surface profiles) of the current collector 304 or of another component of the fuel cell module F may be used to provide a contact force. FIG. 5B illustrates a side view of another exemplary current collector consistent with an embodiment. Referring to FIG. 5B, the current collector 304 may have a polygonal protruding structure in some embodiments, and the polygonal protruding structure may have a flat surface 3042 in one embodiment. The flat surface 3042 may be substantially parallel to the membrane electrode assembly 301 and the gas diffusion layer 302 illustrated in FIG. 2A. The flat surface 3042 may provide a tight contact and reduce contact impedance between the gas diffusion layer 302 and the current collector 304 in some embodiments. While the current collector 304 with the flat surface 3042 is illustrated as having angled bends at the two outer edges of the flat surface 3042, curved edges or other shapes of bending may be applied.

Figure 6:
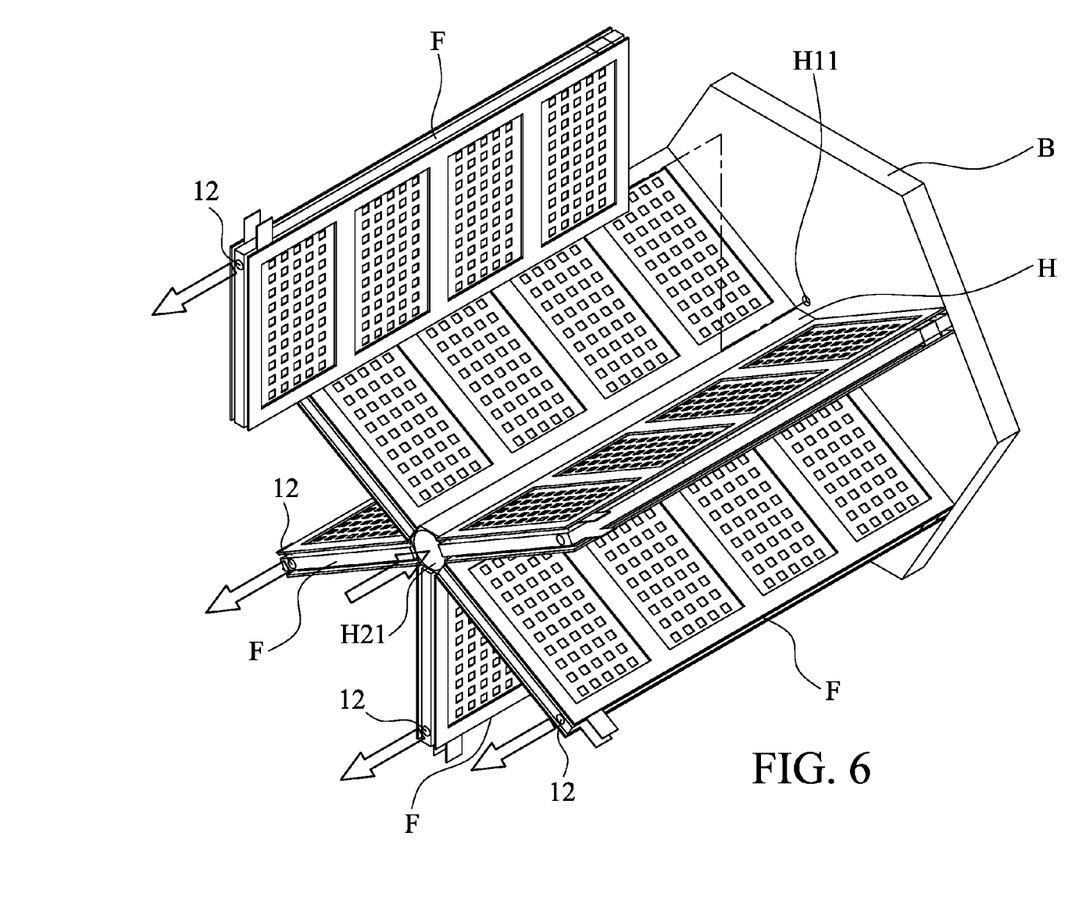
FIG. 6 illustrates a perspective diagram of an exemplary fuel cell system having multiple fuel cell modules consistent with an embodiment.

FIG. 6 illustrates a perspective diagram of an exemplary fuel cell system having multiple fuel cell modules consistent with an embodiment. Referring to FIG. 6, a fuel cell device with multiple fuel cell modules may be formed by mounting a number of fuel cell modules F to a holder H, a base B, or both. In one embodiment, the holder H may be coupled with a lateral edge or side of each of the fuel cell modules, and the holder H may therefore serve as a fuel cell module mount to the fuel cell system. The holder H may have a channel H21 for providing the incoming fluid to the respective first manifolds of the fuel cell modules (or for discharging a discharged fluid of the second manifolds of the fuel cell modules). The base B may be a fluid distribution base in one embodiment, and the fluid distribution base may be coupled between the channel H21 of the holder H and the fuel cell modules F, such as to distribute the incoming fluid to the plurality of fuel cell modules. Specifically, the base B may have a fluid entrance inlet (or outlet) coupled to the channel in the holder H and a number of fluid outlets (or inlets) communicating with the respective second manifolds of the fuel cell modules. In one embodiment, the fuel cell modules may be arranged in a radial configuration around the holder H.

Alternatively, the fuel cell modules F may fixed to the base B and also arranged in a radial configuration around the holder H. Specifically, a reactant fluid can enter the channel H21 of the holder H. The reactant fluid may then flow through the holder H and the base B to the fuel cell modules F. The reactant fluid may then subsequently discharged through the second manifolds 12 of the fuel cell modules F in the direction of the arrows shown in FIG. 6.

Embodiments described above may provide fuel cell modules having a current collector or another component that has a non-planar or protruding structure. In some embodiments, the structure may provide a contact force for forming a tight contact within the fuel cell module, such as between a gas diffusion layer and a current collector and/or for reducing contact impedance between them. In some embodiments, a fuel cell system with a holder, a base, or both to mount multiple fuel cell modules may provide a compact or easy-to-assemble system. And the system may be applied in electronic apparatuses, transportations, vehicles, military equipments, the aerospace industry, etc.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fuel cell module, comprising:
   a membrane electrode assembly comprising at least one membrane for fuel cell reactions;
   two gas diffusion layers respectively coupled with two opposite sides of the membrane electrode assembly;
   two current collectors respectively coupled with the two gas diffusion layers;
   two sealing members respectively coupled with the two current collectors;
   a fluid flow plate assembly coupled with the membrane electrode assembly at a first side of the two opposite sides of the membrane electrode assembly having at least a corresponding one of the two gas diffusion layers, at least a corresponding one of the two current collectors, and at least one of the two sealing members between the fluid flow plate assembly and the first side of the membrane electrode, the fluid flow plate assembly comprising a fluid flow channel having an exposed side that is coupled with a membrane of the at least one membrane; and
   a carrier for a non-planar surface,
   wherein at least one of the membrane electrode assembly, the two gas diffusion layers, the two current collectors, and the two sealing members is substantially rectangular and, prior to an assembly of the membrane electrode assembly, the two gas diffusion layers, the two current collectors, and the two sealing members, has the non-planar surface that is at least partially flattened when the assembly occurs, and
   the carrier includes a slot for receiving an angled edge surface of the non-planar surface, wherein the angled edge structure slides in the slot when the non-planar surface is pressed.

2. The fuel cell module of claim 1, wherein at least one of the two current collectors has the non-planar surface protruding toward the membrane electrode assembly such that a contact force is provided by the at least one of the two current collectors toward a corresponding one of the two gas diffusion layers.

3. The fuel cell module of claim 1, wherein the sealing members are respectively attached to the current collectors by at least one of an injection molding, a hot pressing, and an adhesive.

4. The fuel cell module of claim 1, wherein the gas diffusion layers are respectively coupled with the two opposite sides of the membrane electrode assembly by hot pressing.

5. The fuel cell module of claim 1, wherein the non-planar surface comprises a polygonal structure protruding toward the membrane electrode assembly.

6. The fuel cell module of claim 5, wherein the polygonal structure has a flat surface that is substantially parallel to the membrane electrode assembly.

7. The fuel cell module of claim 1, where in the fluid flow plate assembly further comprises:
   a first manifold having a fluid inlet for receiving an incoming fluid, the first manifold extending along a first direction and providing a channel for transporting the incoming fluid partially along the first direction, the first manifold having at least one distribution outlet, wherein the first manifold releases at least one portion of the incoming fluid as a released fluid through the at least one distribution outlet;
   a second manifold having a fluid outlet for discharging a discharged fluid, the discharged fluid comprising at least one portion of the incoming fluid, the second manifold extending along a second direction and providing a channel for transporting the discharged fluid partially along the second direction, the second manifold receiving the discharged fluid through at least one discharged fluid inlet on the second manifold; and
   the fluid flow channel coupled between the first manifold and the second manifold and between at least one of the at least one distribution outlet and at least one of the at least one discharged fluid inlet for distributing at least one portion of the released fluid, the fluid flow channel having multiple channel sections extending in at least two directions and extending substantially along a fluid distribution plane, the at least one portion of the released fluid flowing through the at least one fluid flow channel and to the at least one of the at least one discharged fluid inlet as at least one portion of the discharged fluid,
   wherein the first direction is substantially parallel with the fluid distribution plane, and the second direction is substantially parallel with the fluid distribution plane.

8. The fuel cell module of claim 7, further comprising at least a base or a holder coupled with an edge of the fuel cell module for providing a fuel cell module mount to a fuel cell system having multiple fuel cell modules.

9. A fuel cell module, comprising:
   a membrane electrode assembly comprising at least one membrane for fuel cell reactions;
   two gas diffusion layers respectively coupled with two opposite sides of the membrane electrode assembly;
   two current collectors respectively coupled with the two gas diffusion layers;

two sealing members respectively coupled with the two current collectors;

a fluid flow plate assembly coupled with the membrane electrode assembly at a first side of the two opposite sides of the membrane electrode assembly having at least a corresponding one of the two gas diffusion layers, at least a corresponding one of the two current collectors, and at least one of the two sealing members between the fluid flow plate assembly and the first side of the membrane electrode, the fluid flow plate assembly comprising a fluid flow channel having an exposed side that is coupled with a membrane of the at least one membrane; and a carrier for a non-planar surface, wherein at least one of the two current collectors is substantially rectangular and, prior to an assembly of the membrane electrode assembly, the two gas diffusion layers, the two current collectors, and the two sealing members, has the non-planar surface that is at least partially flattened when the assembly occurs, and the carrier includes a slot for receiving an angled edge surface of the non-planar surface, wherein the angled edge structure slides in the slot when the non-planar surface is pressed.

10. The fuel cell module of claim 9, wherein the at least one of the two current collectors has the non-planar surface protruding toward the membrane electrode assembly such that a contact force is provided by the at least one of the two current collectors toward a corresponding one of the two gas diffusion layers.

11. The fuel cell module of claim 9, wherein the sealing members are respectively attached to the current collectors by at least one of an injection molding, a hot pressing, and an adhesive.

12. The fuel cell module of claim 9, wherein the non-planar surface comprises a curved structure protruding toward the membrane electrode assembly.

13. The fuel cell module of claim 9, wherein the non-planar surface comprises a polygonal structure protruding toward the membrane electrode assembly.

14. The fuel cell module of claim 9, where in the fluid flow plate assembly further comprises:

a first manifold having a fluid inlet for receiving an incoming fluid, the first manifold extending along a first direction and providing a channel for transporting the incoming fluid partially along the first direction, the first manifold having at least one distribution outlet, wherein the first manifold releases at least one portion of the incoming fluid as a released fluid through the at least one distribution outlet;

a second manifold having a fluid outlet for discharging a discharged fluid, the discharged fluid comprising at least one portion of the incoming fluid, the second manifold extending along a second direction and providing a channel for transporting the discharged fluid partially along the second direction, the second manifold receiving the discharged fluid through at least one discharged fluid inlet on the second manifold; and the fluid flow channel coupled between the first manifold and the second manifold and between at least one of the at least one distribution outlet and at least one of the at least one discharged fluid inlet for distributing at least one portion of the released fluid, the fluid flow channel having multiple channel sections extending in at least two directions and extending substantially along a fluid distribution plane, the at least one portion of the released fluid flowing through the at least one fluid flow channel and to the at least one of the at least one discharged fluid inlet as at least one portion of the discharged fluid, wherein the first direction is substantially parallel with the fluid distribution plane, and the second direction is substantially parallel with the fluid distribution plane.

* * * * *